United States Patent [19]

Li

[11] Patent Number: 5,995,927
[45] Date of Patent: Nov. 30, 1999

[54] METHOD FOR PERFORMING STOCHASTIC MATCHING FOR USE IN SPEAKER VERIFICATION

[75] Inventor: Qi P. Li, New Providence, N.J.

[73] Assignee: Lucent Technologies Inc., Murray Hill, N.J.

[21] Appl. No.: 08/818,188

[22] Filed: Mar. 14, 1997

[51] Int. Cl.⁶ ............................................. G10L 9/00
[52] U.S. Cl. .................... 704/246; 704/250; 704/233; 704/256
[58] Field of Search ................. 381/56, 57; 704/286, 704/226, 231, 233, 243, 251, 245, 236, 241, 246, 250

[56] References Cited

U.S. PATENT DOCUMENTS

| | | | |
|---|---|---|---|
| 5,167,004 | 11/1992 | Netsch et al. ............................ | 704/200 |
| 5,473,728 | 12/1995 | Luginbuhl et al. ..................... | 704/243 |
| 5,583,951 | 12/1996 | Sirat et al. .............................. | 382/232 |
| 5,727,124 | 3/1998 | Lee et al. ................................ | 704/233 |

FOREIGN PATENT DOCUMENTS 0 397 399  11/1990  European Pat. Off. .......... G10L 5/06

OTHER PUBLICATIONS

R. J. Mammmone et al., "Robust Speaker Recognition," *IEEE Signal Processing Magazine*, Sep. 1996, pp. 58–71.

B. S. Atal, "Effectiveness of Linear Prediction Characteristics of the Speech Wave for Automatic Speaker Identificaton and Verification," *J. Acoust. Soc. Am.*, vol. 55, No. 6, Jun. 1974, pp. 1304–1312.

B. S. Atal, "Automatic Recognition of Speakers From Their Voices," *Proceedings of the IEEE*, vol. 64, No. 4, Apr. 1976, pp. 460–475.

S. Furui, Cepstral Analysis Technique For Automatic Speaker Verification, *IEEE Transactions on Acoustics, Speech, and Signal Processing*, vol. ASSP–29, No. 2, apr. 1981, pp. 254–272.

A. E. Rosenberg et al., "Cepstral Channel Normalization Techniques For HMM–Based Speaker Verification," *ICSLP 94, Yokohama*, pp. 1835–1838.

A. Sankar et al., "A Maximum–Likelihood Approach To Stochastic Matching For Robust Speech Recognition," *IEEE Transactions on Speech And Audio Processing*, vol. 4, No. 3, May 1996, pp. 190–202.

A. C. Surendran, "Maximum Likelihood Stochastic Matching Approach To Non–Linear Equalization For Robust Speech Recognition," Busch Campus, New Jersey, May 1996, pp. i–xiv, 1–101.

(List continued on next page.)

*Primary Examiner*—Susan Wieland
*Attorney, Agent, or Firm*—Kenneth M. Brown

[57] ABSTRACT

A method and an apparatus for performing stochastic matching of a set of input test speech data with a corresponding set of training speech data. In particular, a set of input test speech feature information, having been generated from an input test speech utterance, is transformed so that the stochastic characteristics thereof more closely match the stochastic characteristics of a corresponding set of training speech feature information. The corresponding set of training speech data may, for example, comprise training data which was generated from a speaker having the claimed identity of the speaker of the input test speech utterance. Specifically, in accordance with the present invention, a first covariance matrix representative of stochastic characteristics of input test speech feature information is generated based on the input test speech feature information. Then, a transformation is performed on the input test speech feature information, the transformation being based on the first covariance matrix and on a second covariance matrix representative of the stochastic characteristics of the training speech feature information. This transformation advantageously results in transformed input test speech feature information having stochastic characteristics more closely matched to the stochastic characteristics of the speech training feature information.

24 Claims, 2 Drawing Sheets

OTHER PUBLICATIONS

M. G. Rahim, et al., "Signal Bias Removal by Maximum Likelihood Estimation For Robust Telephone Speech Recognition," *IEEE Transactions On Speech And audio Processing*, vol. 4, No. 1, Jan. 1996, pp. 19–30.

D. Mansour et al., "A Family Of Distortion Measures Based Upon Projection Operation For robust Speech Recognition," *IEEE Transactions On Acoustics, Speech, And Signal Processing*, vol. 37, No. 11, Nov. 1989, pp. 1659–1671.

S. Parthasarathy et al., "General Phrase Speaker Verification Using Sub–Word Background Models And Likelihood–Ratio Scoring," *ICSLP 96*, pp. 1–4.

Bogner, Robert E., "Pattern Recognition via Observation Correlations", IEEE Transactions On Pattern Analysis And Machine Intelligence, vol. PAMI–3, No. 2, Mar. 1981, New York, NY, US, pp. 128–133.

Mammone, R. J., Zhang, X., Ramachandran, R. P., "Robust Speaker Recognition: A Feature–based Approach", IEEE Signal Processing Magazine, vol. 13, No. 5, Sep. 1996, New York, NY, US, pp. 58–71.

METHOD FOR PERFORMING STOCHASTIC MATCHING FOR USE IN SPEAKER VERIFICATION

FIELD OF THE INVENTION

The present invention relates in general to the field of speaker verification and more particularly to methods for compensating for an acoustic mismatch between speaker verification training and test environments.

BACKGROUND OF THE INVENTION

Speaker verification systems recognize an individual by verifying a claim of identity provided by the individual through an analysis of spoken utterances. In the context of a telecommunications system, for example, speaker verification may be employed to verify the identity of a caller who is charging a call to a credit or calling card. Generally, these systems operate by comparing extracted features of an utterance received from an individual who claims a certain identity to one or more prototypes of speech based on (i.e., "trained" by) utterances which have been previously provided by the identified person.

One significant problem which is frequently encountered in speaker verification systems in the telecommunication context is that a person who has trained a verification system does not always "sound the same" when undertaking a verification trial. Changes in a person's "sound" over time may be caused by, for example, changes in the characteristics of the telecommunications channel carrying the person's voice signals. These changes may be caused by no more than the use of different telephones for the training process and the verification trial. Naturally (and unfortunately), such changes often substantially degrade verification system performance. In fact, because of sensitivity to changing channel characteristics, or even to a speaker's loudness level, verification system performance may degrade to unacceptable levels.

More specifically, speaker recognition systems typically create a speaker-dependent hidden Markov model (HMM) for a given individual whose identity is to be capable of being verified, by performing training based on data often collected in a single enrollment session. The HMM, therefore, matches the probability density function ("pdf") of the training data perfectly. In a subsequent verification session, however, test data may be collected through a different telephone channel and handset. (Data collected during a training process will be referred to herein as "training data" or "training speech data," whereas data obtained during a verification session will be referred to herein as "test data" or "test speech data." In addition, the terms "training information" or "training speech information" will be used to denote information based on the training data, such as, for example, models.) Since the acoustic conditions may be different between the enrollment session and the verification session, a stochastic mismatch may occur between the set of test data and the set of data which was used to train the HMM. Speaker recognition performance is degraded by such a mismatch.

Mathematically, the above-described mismatch can be represented as a linear transform in the cepstral domain:

$$y = Ax + b, \qquad (1)$$

where x is a vector of the cepstral frame of a test utterance; A and b are the matrix and vector which, if properly estimated for the given test utterance, can be applied as shown to eliminate the mismatch; and y is the resultant transformed vector which matches the training data (See, e.g., R. J. Mammone et al., "Robust Speaker Recognition," IEEE Signal Processing Magazine, vol. 13, pp. 58–71, September 1996.) Geometrically, b represents a translation of the test data and A represents both a scale and a rotation thereof. (Note that when A is diagonal, it represents only a scaling operation.)

Prior art speaker verification systems have been limited in their ability to handle stochastic mismatch. For example, Cepstral mean subtraction has often been used for handling stochastic mismatch in both speaker and speech recognition applications. Viewed with respect to Equation (1), this technique essentially estimates b and assumes A to be an identity matrix. For example, in A. E. Rosenberg et al., "Cepstral Channel Normalization Techniques for HMM-based Speaker Verification," Proc. of Int. Conf. on Spoken Language Processing, pp. 1835–1838, 1994, the vector b was estimated by long term averaging, short term averaging, and a maximum likelihood (ML) approach. In A Sankar et al., "A Maximum-Likelihood Approach to Stochastic Matching for Robust Speech Recognition," IEEE Trans. on Speech and Audio Processing, vol. 4, pp. 190–202, May, 1996, maximum likelihood approaches were used to estimate b, a diagonal A, and model parameters for HMMs for purposes of stochastic matching. Recently, a least-squares solution of the linear transform parameters (i.e., A and b) was briefly introduced in R. J. Mammone et al., "Robust Speaker Recognition," cited above. However, none of the prior art approaches to the stochastic mismatch problem have provided an efficient technique to adequately match the overall distribution of the test data with that of the training data based on a generalized linear transform.

SUMMARY OF THE INVENTION

The present invention provides a method and an apparatus for performing stochastic matching of a set of input test speech data with a corresponding set of training speech data. In particular, a set of input test speech feature information, having been generated from an input test speech utterance, is transformed so that the stochastic characteristics thereof more closely match the stochastic characteristics of a corresponding set of training speech feature information. In the illustrative context of a speaker verification task, the corresponding set of training speech data may, for example, comprise training data which was generated from a speaker having the claimed identity of the speaker of the input test speech utterance.

Specifically, in accordance with the present invention, a first covariance matrix representative of stochastic characteristics of input test speech feature information is generated based on the input test speech feature information. Then, a transformation is performed on the input test speech feature information, the transformation being based on the first covariance matrix and on one or more second covariance matrices representative of the stochastic characteristics of the training speech feature information. This transformation advantageously results in transformed input test speech feature information having stochastic characteristics more closely matched to the stochastic characteristics of the training speech feature information.

In accordance with one illustrative embodiment of the present invention, the transformation comprises a linear transform in which the input test speech feature information comprises a cepstral domain data vector from a frame of the input test speech utterance. In this illustrative embodiment, the linear transform is advantageously of the form of Equation (1), and, in particular, comprises a multiplication of the cepstral frame data vector by a matrix derived from the first and one or more second covariance matrices (which multiplication advantageously effectuates scaling and rotation of the data), followed by the addition of a further derived vector (which addition advantageously effectuates translation of the data).

BRIEF DESCRIPTION OF THE DRAWINGS

FIG. 1A shows a geometric interpretation of a set of training data;

FIG. 1B shows a geometric interpretation of a set of training data and a corresponding set of test data;

FIG. 1C shows a geometric interpretation of a set of training data and a corresponding set of test data which has been scaled and rotated in accordance with an illustrative embodiment of the present invention; and FIG. 1D shows a geometric interpretation of a set of training data and a corresponding set of test data which has been scaled, rotated, and translated, in accordance with an illustrative embodiment of the present invention, so as to coincide with the set of training data.

DETAILED DESCRIPTION

Overview

Figure 1A:
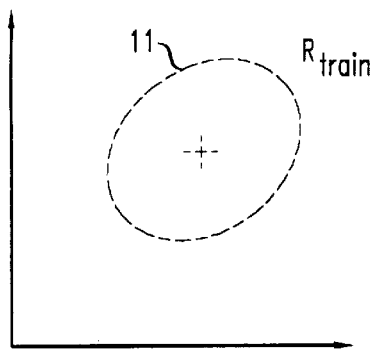
FIGS. 1A–1D show a geometric representation of the stochastic matching of test data to training data in accordance with an illustrative embodiment of the present invention.
Figure 1B:
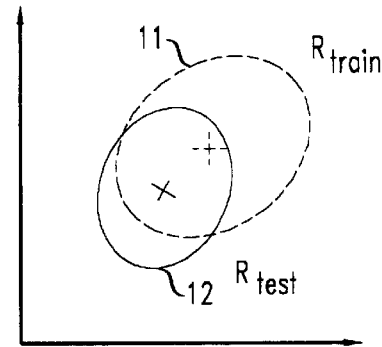
Figure 1C:
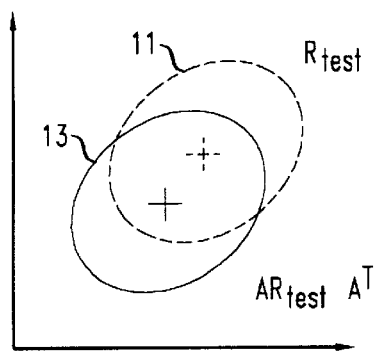
Figure 1D:
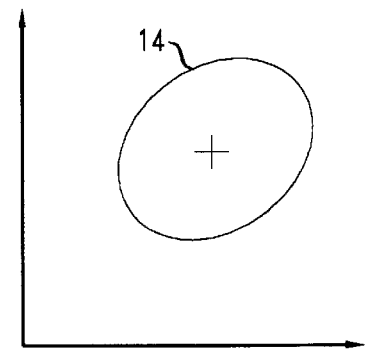

FIGS. 1A–1D show a geometric representation of the stochastic matching of test data to training data in accordance with an illustrative embodiment of the present invention. In FIG. 1A (as well as in FIGS. 1B and 1C), dashed line 11 represents a contour of training data for a given speaker. In FIG. 1B, solid line 12 represents a contour of test data. Due to different channels, noise levels, and telephone transducers, the mean of the test data (marked with a solid cross centered within the contour region) is translated from the mean of the training data (marked with a dashed cross), and the distribution of the test data is compressed and rotated from that of the training data. (See, e.g., R. J. Mammone et al., "Robust Speaker Recognition," cited above, for a discussion as to the "shrinking" of the test data as compared with the training data.) The stochastic mismatch between the test data and the training data may result in an incorrect decision when using the trained HMM to score the (mismatched) test data. In accordance with an illustrative embodiment of the present invention, however, the test data may be advantageously transformed to more closely stochastically match the training data, as shown in FIGS. 1C and 1D.

In particular, and in accordance with an illustrative embodiment of the present invention, a matrix, $R_{train}$, is derived from the training data, which matrix characterizes the overall distribution of the training data. In particular, $R_{train}$ is the average of one or more covariance matrices generated from the training data from each of a corresponding one or more training utterances. Note that $R_{train}$ may be advantageously derived a priori (i.e., during the training process) and stored together with the other training information (e.g., the HMMs). Then, at a speaker verification session, a covariance matrix, $R_{test}$, is derived from the test data, which matrix similarly characterizes the overall distribution of the test data. Then, the parameters of the A matrix for the linear transform shown in Equation (1) may be estimated based upon the two matrices, $R_{train}$ and $R_{test}$ (see below). After applying the first part of the transform specified in Equation (1)—that is, after multiplying the test data by the matrix A—the overall distribution of the test data is scaled and rotated to be approximately the same as that of the training data, except for the difference of the means, as shown in FIG. 1C (where solid line 13 represents a contour of the scaled and rotated test data). In the final step, the difference of the means is determined (see below), and the test data is translated so that its location is approximately the same as that of the training data, as shown in FIG. 1D, where the contour of the transformed test data has overlapped the contour of the training data. (In FIG. 1D, solid line 14 represents the common contour of the training data and the scaled, rotated and translated test data.) This last step reflects the addition of the vector b as specified in Equation (1).

Note that performing the above-described linear transformation changes the overall distribution of the test data, but it does not destroy the details of the pdf of the test data (because the transformation is linear). These pdf details will be advantageously measured and evaluated by the trained speaker-dependent HMM in a conventional manner, in order to perform the final step of the speaker verification process.

In accordance with the illustrative embodiment of the present invention described above, if the conditions during the generation of test data from a true (i.e., correctly identified) speaker mismatch the conditions during which the HMMs were trained, the test data will be advantageously transformed to (approximately) stochastically match the training data which was used to train the given speaker's HMM. If the conditions during the generation of test data from a true speaker in fact match those during which the training occurred, the calculated A matrix and b vector will be close to an identity matrix and a zero vector, respectively, so the transform will have a minimal effect on the HMM scores.

Note that the above-described technique attempts to "improve" stochastically mismatched data regardless of whether the mismatch occurs because the test and training conditions differ or because the test and training data originate from different speakers (i.e., the speaker is an imposter—that is, an individual other that the one whose identity has been claimed). However, it will be clear to one of ordinary skill in the art that speaker characteristics which uniquely identify a given speaker are found mainly in the details of the representation (e.g., in the HMMs). To the extent that such speaker characteristics are also found in global features, the technique of the present invention has the potential to increase the matching scores between test utterances spoken by an imposter and the identified speaker model. In such cases, the performance of a speaker verification system employing the principles of the present invention could, in fact, degrade, particularly when other sources of stochastic mismatch are absent (e.g., when test and training conditions are actually matched). Nonetheless, experiments with illustrative embodiments of the present invention have shown that speaker verification performance does, in fact, improve overall, when these inventive techniques are employed.

Derivation of the transform data

In a typical speaker verification training session, data from multiple utterances by a given speaker having the same content are collected. (That is, the same word or phrase is spoken repeatedly by the given individual.) The speaker-dependent HMMs are then generated based on this plurality of training utterances. In accordance with an illustrative embodiment of the present invention, in addition to the creation of the HMM, a matrix $R_{train}$ and a mean vector $m_{train}$ are also derived from these training utterances. In particular, $R_{train}$ is the average of the covariance matrices for the training data from each of the training utterances, and $m_{train}$ is the average of the means of the training data from each of the training utterances. As such they represent the overall distribution and mean of the training data from all of the training utterances in a cepstral domain. Specifically, $$R_{train} = \frac{1}{U}\sum_{i=1}^{U} \frac{1}{N_i}\sum_{j=1}^{N_i} (x_{i,j} - m_i)(x_{i,j} - m_i)^T \quad (2)$$

$$m_{train} = \frac{1}{U}\sum_{i=1}^{U} m_i \quad (3)$$

where $x_{ij}$ is the j'th non-silence frame in the i'th training utterance, U is the total number of training utterances, $N_i$ is the total number of non-silence frames, $m_i$ is the mean vector of the i'th training utterance, and $m_{train}$ is the average mean vector of the non-silence frames of all training utterances.

In a test (i.e., speaker verification) session, only one utterance will be collected and verified at a time. The covariance matrix for the test data is $$R_{test} = \frac{1}{N_f}\sum_{j=1}^{N_f} (x_j - m_{test})(x_j - m_{test})^T \quad (4)$$

where $x_j$ is a non-silence frame, $m_{test}$ is the mean vector of the test data, and $N_f$ is the total number of non-silence frames.

The proposed criterion for parameter estimation is to have $R_{test}$ match $R_{train}$ through a rotation, scale, and translation (RST) of the test data. For rotation and scaling, we have the following equation which reflects this criterion:

$$R_{train} - A\, R_{test} A^T = 0 \quad (5)$$

where A is defined as in Equation (1), and where $R_{train}$ and $R_{test}$ are defined as in Equations (2) and (4), respectively. By solving Equation (5) for the A matrix from Equation (1):

$$A = R_{train}^{\frac{1}{2}} R_{test}^{-\frac{1}{2}} \quad (6)$$

Then, the translation term b of Equation (1) can be obtained by $$b = m_{train} - m_{rs} = m_{train} - \frac{1}{N_f}\sum_{j=1}^{N_f} A x_j \quad (7)$$

where $m_{train}$ is defined as in Equation (3), $m_{rs}$ is a mean vector of rotated and scaled frames, $N_f$ is the total number of non-silence frames of the test utterance, and $x_j$ is the j'th non-silence cepstral vector frame.

In accordance with an illustrative embodiment of the present invention, a given test utterance may be verified against a set of true speaker's models (consisting of a speaker-dependent HMM plus $R_{train}$ and $m_{train}$ as defined in Equations (2) and (3), respectively, above). Specifically, $R_{test}$, A, and b may first be calculated by using Equations (4), (6), and (7), respectively, and then all of the test frames may be advantageously transformed by using Equation (1) to reduce the stochastic mismatch between the test data and the training data.

An illustrative method for transforming cepstral test data

Figure 2:
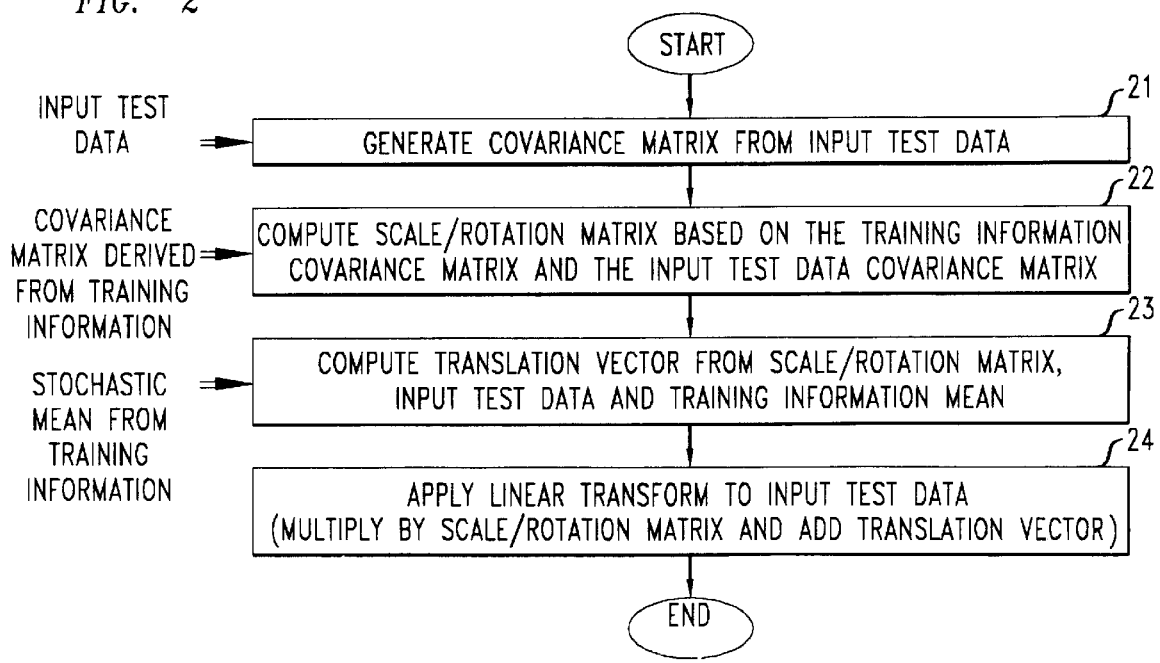
FIG. 2 shows a flow chart for implementing a method of performing stochastic matching of test data to training data in accordance with an illustrative embodiment of the present invention.

FIG. 2 shows a flow chart for implementing a method of performing stochastic matching of test data to training data in accordance with an illustrative embodiment of the present invention. Specifically, the test data is used to generate a covariance matrix (i.e., $R_{test}$) therefrom in accordance with Equation (4), above (block 21). Then, this test data covariance matrix and a covariance matrix derived from the training information (i.e., $R_{train}$) are used to compute the scale/rotation matrix (i.e., A) in accordance with Equation (6), above (block 22). The training information covariance matrix (i.e., $R_{train}$) has been advantageously pre-computed in accordance with Equation (2), above. (We will take the liberty herein to refer to the matrix $R_{train}$ as a training information "covariance matrix," even though, as explained above, when a plurality of training utterances are used it is, more accurately, an average of a plurality of covariance matrices.) Note that the particular set of training data—or, equivalently, the particular training information covariance matrix—advantageously corresponds to the identity claimed by the speaker of the utterance from which the test data has been derived.

Next, the translation vector (i.e., b) is computed based on the scale/rotation matrix (i.e., A) and a stochastic mean derived from the training information (i.e., $m_{train}$) in accordance with Equation (7), above (block 23). The training information mean (i.e., $m_{train}$) has been advantageously pre-computed in accordance with Equation (3), above. Finally, a linear transform in accordance with Equation (1), above, is applied to the test data (i.e., x), thereby matching the stochastic characteristics of the test data more closely to those of the particular set of training data. In particular, the test data is multiplied by the scale/rotation matrix (i.e., A), and the translation vector (i.e., b) is then added to the result.

An illustrative speaker verification system

Figure 3:
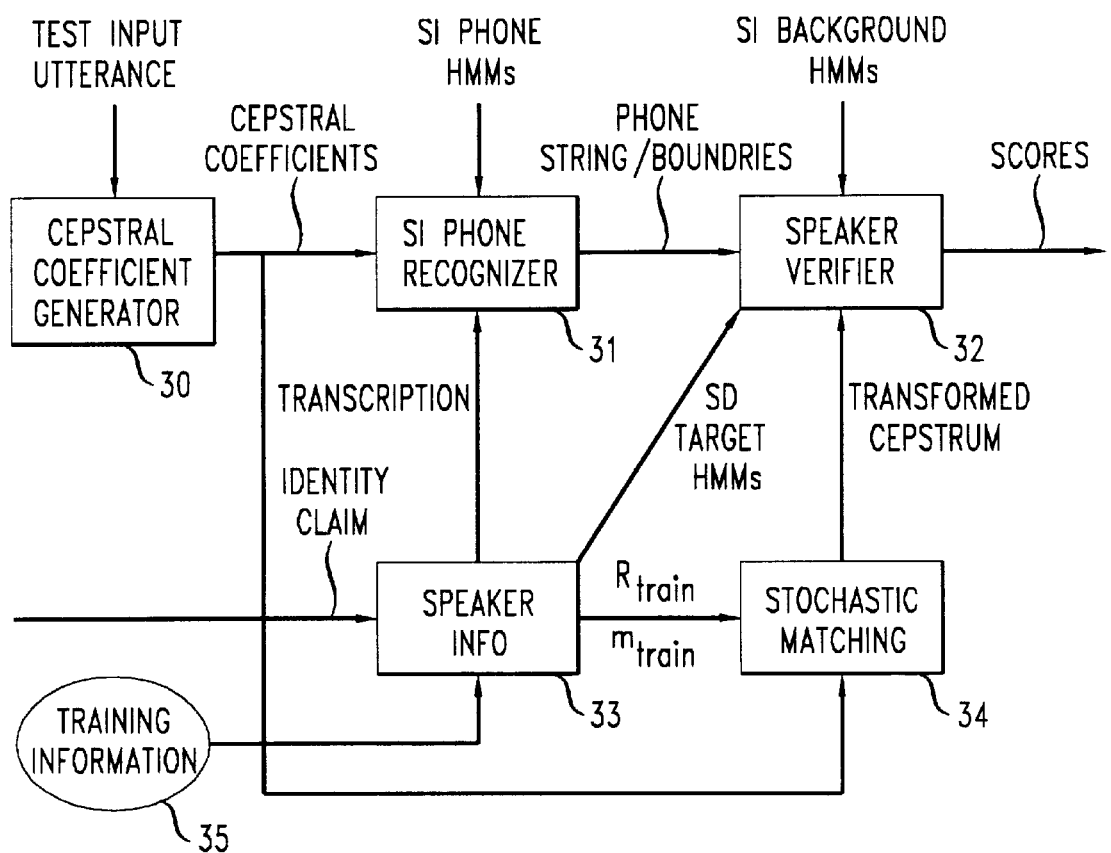
FIG. 3 shows a phrase-based speaker verification system employing a method of performing stochastic matching of test data to training data in accordance with an illustrative embodiment of the present invention.

In accordance with an illustrative embodiment of the present invention, the above-described stochastic matching transformation procedure may be applied to an otherwise conventional text-dependent speaker verification system using general phrase passwords. FIG. 3 shows such a phrase-based speaker verification system employing a method of performing stochastic matching of test data to training data in accordance with an illustrative embodiment of the present invention. The illustrative system of FIG. 3 is based on a system described in S. Parthasarathy et al., "General Phrase Speaker Verification Using Sub-Word Background Models and Likelihood-Ratio Scoring," Proc. ICSPL-96, October 1996. However, stochastic matching in accordance with an illustrative embodiment of the present invention is included in the front-end processing of the illustrative system of FIG. 3, as compared, for example, to the system described in "General Phrase Speaker Verification Using Sub-Word Background Models and Likelihood-Ratio Scoring," so as to provide improved system robustness and performance.

Specifically, the illustrative system of FIG. 3 operates as follows. After a speaker claims an identity (ID) and provides that identity claim to speaker information processor 33, the system accepts a test input phrase uttered by the speaker. Based upon the claimed identity, speaker information processor 33 retrieves the associated training information from training information database 35. In accordance with an illustrative embodiment of the present invention, the retrieved training information includes the target speaker's HMM, a saved phone transcription (see below), and advantageously pre-computed covariance matrix $R_{train}$ and value $m_{train}$.

Next, cepstral coefficient generator 30 produces the cepstral coefficients from the test utterance. Since the system expects that the same phrase was obtained in the associated training session, speaker independent (SI) phone recognizer 31 segments the input utterance into a sequence of phones by a forced decoding which uses a transcription which has been saved from the enrollment session (and is provided to SI phone recognizer 31 by speaker information processor 33). Note that since the speaker dependent (SD) models have been trained on a relatively small amount of data from a single session, they are preferably not used for phone segmentation purposes. Instead, SI phone models (HMMs) are advantageously used by SI phone recognizer 31 to provide reliable and consistent phone segmentations.

Meanwhile, in accordance with an illustrative embodiment of the present invention, the cepstral coefficients of the utterance from the test speaker (as produced by cepstral coefficient generator 30) are transformed by stochastic matching processor 34 to produced a transformed cepstrum which more closely stochastically matches the training data distribution. In particular, stochastic matching processor 34 illustratively implements the procedure of FIG. 2, computing, in sequence, Equations (4), (6), (7), and (1). Finally, the transformed cepstral coefficients (from stochastic matching processor 34), the decoded phone sequence and associated phone boundaries (from SI phone recognizer 31), and the identified target (SD) HMM (from speaker information processor 33), are transmitted to speaker verifier 32. Speaker verifier 32 calculates a conventional log-likelihood-ratio score based on the log-likelihood scores of the target and background models, thereby enabling a determination as to the veracity of the claimed identity of the speaker. In particular, speaker verifier 32 computes:

$$L_R(o;\Lambda_t;\Lambda_b) = L(o,\Lambda_t) - L(o,\Lambda_b) \quad (8)$$

where o is the observation sequence over the entire phrase, and $\Lambda_t$ and $\Lambda_b$ are the target and background models respectively. The background model is a set of HMM for phones, whereas the target model is a single HMM with multiple states for the entire phrase. As is well known to those skilled in the art, this configuration typically provides the best results. (See, e.g., S. Parthasarathy et al., "General Phrase Speaker Verification Using Sub-Word Background Models and Likelihood-Ratio Scoring," cited above.)

Specifically, $$L(o,\Lambda_t) = 1/N_f P(o|\Lambda_t) \quad (9)$$

where $P(o|\Lambda_t)$ is the log-likelihood of the phrase evaluated by the HMM, $\Lambda_t$, using Viterbi decoding (familiar to those of ordinary skill in the art), and $N_f$ is the total number of non-silence frames in the phrase; and $$L(O, \Lambda_b) = \frac{1}{N_f} \sum_{i=1}^{N_p} P(O_i | \Lambda_{b_i}) \quad (10)$$

where $P(o|\Lambda_{b_i})$ is the log-likelihood of the i'th phone, $o_i$ is the segmented observation sequence over the i'th phone, $\Lambda_{b_i}$ is an HMM for the i'th phone, $N_p$ is the total number of the decoded non-silence phones, and $N_f$ is the total number of non-silence frames in the phrase.

A final decision on rejection or acceptance is made by comparing the $L_R$ score of Equation (8) with a threshold. In addition, if a significantly different phrase is provided as the test utterance (as compared to the identified speaker's training utterance phrase), the phrase could be rejected a priori by SI phone recognizer 31 (i.e., without using speaker verifier 32 to accept or reject the test utterance).

Additional details

The feature vector used in the illustrative embodiment of the present invention described herein is conventional and may, for example, be composed of 12 cepstrum and 12 delta cepstrum coefficients. The cepstrum may be derived from a 10th order Linear Predictive Coefficient (LPC) analysis over, for example, a 30 millisecond window. The feature vectors may, for example, be updated at 10 millisecond intervals.

An experimental database was created consisting of fixed phrase utterances recorded over long distance telephone networks by 100 speakers—51 male and 49 female. The fixed phrase, common to all speakers, was "I pledge allegiance to the flag," with an average length of 2 seconds. Five utterances of each speaker recorded in one session were used to train a SD HMM and to derive $R_{train}$ and $m_{train}$ for the linear transform. For testing, 50 utterances recorded from a true speaker at different sessions, using different telephone channels at different times, and 200 utterances recorded from 50 impostors of the same gender at different sessions, were employed. For model adaptation purposes (i.e., updating the models based on subsequent, verified, true speaker utterances), the second, fourth, sixth, and eighth test utterances from the tested true speaker were used to update the associated HMM plus $R_{train}$ and $m_{train}$ for verifying succeeding test utterances. The target models for phrases were conventional left-to-right HMMs. The number of states were 1.5 times the total number of phones in the phrases, and there were 4 Gaussian components associated with each state. The background models used were concatenated phone HMMs trained on a telephone speech database from different speakers and texts. Each phone HMM had 3 states with 32 Gaussian components associated with each state. Finally, note that due to unreliable variance estimates from a limited amount of training data, a global variance estimate was used as a common variance to all Gaussian components in the target models. (See, e.g., S. Parthasarathy et al., "General Phrase Speaker Verification Using Sub-Word Background Models and Likelihood-Ratio Scoring," cited above.)

The results of the above-described experimentation are as follows. When there was no model adaptation, the proposed algorithm improved the equal-error rates by 56% as compared with a baseline system which performed no stochastic matching whatsoever, and 14% compared with a system which used Cepstral mean subtraction. When model adaptation was applied, the improvements reduced to 54% and 8%, respectively. Less improvement is obtained in this case because the SD models are updated to fit different acoustic conditions.

Addendum

For clarity of explanation, the illustrative embodiment of the present invention is presented as comprising individual functional blocks (including functional blocks referred to as "processors"). The functions these blocks represent may be provided through the use of either shared or dedicated hardware, including, but not limited to, hardware capable of executing software. For example, the functions of processors presented herein may be provided by a single shared processor or by a plurality of individual processors. Moreover, use of the term "processor" herein should not be construed to refer exclusively to hardware capable of executing software. Illustrative embodiments may comprise digital signal processor (DSP) hardware, such as Lucent Technologies' DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the word "processor" as used herein.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention. For example, although the present invention has been shown herein as it may be advantageously applied to a speaker verification system, the method of the present invention may be applied to other tasks requiring the processing of speech input as well, such as, for example, speaker identification and speech recognition tasks.

It is claimed:

1. A method comprising the steps of:
   receiving an input test signal representing a speech utterance;
   generating a set of input test speech feature information from the input test signal;
   generating a first covariance matrix based on the set of input test speech feature information, the first covariance matrix representative of stochastic characteristics of the set of input test speech feature information; and
   performing a transformation on the set of input test speech feature information to generate a transformed set of input test speech feature information, the transformation based on the first covariance matrix and on one or more second covariance matrices, the one or more second covariance matrices representative of stochastic characteristics of a set of training speech feature information, wherein the stochastic characteristics of the training speech feature information are more closely matched to stochastic characteristics of the transformed set of input test speech feature information than to the stochastic characteristics of the set of input test speech feature information.

2. The method of claim 1 wherein the transformation is further based on one or more stochastic means of the training speech feature information.

3. The method of claim 2 wherein the transformation is further based on an average of a plurality of said stochastic means of the training speech feature information.

4. The method of claim 1 wherein the set of input test speech feature information comprises cepstral domain data generated from a frame of said input test speech signal.

5. The method of claim 4 wherein the transformation comprises a linear transform of said cepstral domain data.

6. The method of claim 5 wherein the cepstral domain data comprises a cepstral frame data vector generated from said frame of the input test speech signal, and wherein the step of performing said linear transform comprises calculating a product term by multiplying the cepstral frame data vector by a matrix derived from the first and second covariance matrices.

7. The method of claim 6 wherein the step of performing said linear transform further comprises adding a vector to said product term, wherein said vector is based on said matrix derived from the first and second covariance matrices and on one or more stochastic means of the training speech feature information.

8. The method of claim 1 wherein said speech utterance comprises a speaker verification utterance and said training speech feature information comprises feature information based on speaker verification training data.

9. The method of claim 8 further comprising the steps of:
   receiving a claimed identity of a speaker of the speech utterance; and
   determining a likelihood that the speaker of the speech utterance and the claimed identity thereof are identical, based on the set of training speech feature information and the transformed set of the input test speech feature information.

10. The method of claim 9 wherein said step of determining said likelihood comprises applying said transformed set of the input test speech feature information to a model generated based on said set of training speech feature information.

11. The method of claim 10 wherein said model comprises a Hidden Markov Model.

12. The method of claim 1 wherein the transformation is based on the first covariance matrix and on an average of a plurality of said second covariance matrices.

13. An apparatus comprising:
    an input test signal receiver which receives an input test signal representing a speech utterance;
    an input test speech feature information generator which generates a set of input test speech feature information from the input test signal;
    a first covariance matrix generator based on the set of input test speech feature information, the first covariance matrix representative of stochastic characteristics of the set of input test speech feature information; and
    a transformation applied to the set of input test speech feature information to generate a transformed set of input test speech feature information, the transformation based on the first covariance matrix and on one or more second covariance matrices, the one or more second covariance matrices representative of stochastic characteristics of a set of training speech feature information, wherein the stochastic characteristics of the training speech feature information are more closely matched to stochastic characteristics of the transformed set of input test speech feature information than to the stochastic characteristics of the set of input test speech feature information.

14. The apparatus of claim 13 wherein the transformation is further based on one or more stochastic means of the training speech feature information.

15. The apparatus of claim 14 wherein the transformation is further based on an average of a plurality of said stochastic means of the training speech feature information.

16. The apparatus of claim 13 wherein the set of input test speech feature information comprises cepstral domain data generated from a frame of said input test speech signal.

17. The apparatus of claim 16 wherein the transformation comprises a linear transform of said cepstral domain data.

18. The apparatus of claim 17 wherein the cepstral domain data comprises a cepstral frame data vector generated from said frame of the input test speech signal, and wherein the transformation comprises a multiplier which calculates a product term by multiplying the cepstral frame data vector by a matrix derived from the first and second covariance matrices.

19. The apparatus of claim 18 wherein the transformation further comprises an adder which adds a vector to said product term, wherein said vector is based on said matrix derived from the first and second covariance matrices and on one or more stochastic means of the training speech feature information.

20. The apparatus of claim 13 wherein said speech utterance comprises a speaker verification utterance and said training speech feature information comprises feature information based on speaker verification training data.

21. The apparatus of claim 20 further comprising:

means for receiving a claimed identity of a speaker of the speech utterance; and a speaker verifier which determines a likelihood that the speaker of the speech utterance and the claimed identity thereof are identical, based on the set of training speech feature information and the transformed set of the input test speech feature information.

22. The apparatus of claim 21 wherein said speaker verifier comprises means for applying said transformed set of the input test speech feature information to a model generated based on said set of training speech feature information.

23. The apparatus of claim 22 wherein said model comprises a Hidden Markov Model.

24. The apparatus of claim 13 wherein the transformation is based on the first covariance matrix and on an average of a plurality of said second covariance matrices.

* * * * *